(12) United States Patent
Quick et al.

(10) Patent No.: US 7,334,019 B2
(45) Date of Patent: Feb. 19, 2008

(54) DELIVERING MESSAGES TO MESSAGE SERVERS

(75) Inventors: Ryan Quick, San Jose, CA (US); Chris Quaintance, Los Gatos, CA (US); Inna Vogel, Los Gatos, CA (US); Chad Musick, Santa Clara, CA (US); Michael Wilson, Los Gatos, CA (US); Thorsten Lockert, Chapel Hill, NC (US)

(73) Assignee: eBay Inc., San Jose, CA (US)

( * ) Notice: Subject to any disclaimer, the term of this patent is extended or adjusted under 35 U.S.C. 154(b) by 426 days.

(21) Appl. No.: 10/199,155

(22) Filed: Jul. 18, 2002

(65) Prior Publication Data

US 2004/0015505 A1   Jan. 22, 2004

(51) Int. Cl.
*G06F 15/167* (2006.01)
(52) U.S. Cl. .............. 709/206; 709/213; 709/236
(58) Field of Classification Search ........ 709/206–207, 709/217–219; 715/505; 719/313–314
See application file for complete search history.

(56) References Cited

U.S. PATENT DOCUMENTS

| | | | |
|---|---|---|---|
| 5,778,178 A | | 7/1998 | Arunachalum |
| 5,878,056 A | * | 3/1999 | Black et al. ............ 709/237 |
| 5,987,500 A | | 11/1999 | Arunachalam |
| 6,085,201 A | * | 7/2000 | Tso ............ 715/505 |
| 6,212,556 B1 | | 4/2001 | Arunachalam |
| 6,466,937 B1 | * | 10/2002 | Fascenda ........ 707/10 |
| 6,510,429 B1 | * | 1/2003 | Todd ............ 719/314 |
| 6,597,688 B2 | * | 7/2003 | Narasimhan et al. ....... 370/353 |
| 6,687,743 B1 | * | 2/2004 | Innes ........ 709/206 |
| 2002/0078132 A1 | * | 6/2002 | Cullen et al. ........ 709/201 |
| 2004/0019487 A1 | * | 1/2004 | Kleindienst et al. ...... 704/270.1 |

FOREIGN PATENT DOCUMENTS

GB           2 354 849 A   *   4/2001

OTHER PUBLICATIONS

Dieter Wackerow, MQSeries Primer, IBM, MQSeries Enterprise Application Integration Center, Oct. 1999, pp. 1-7.*

* cited by examiner

*Primary Examiner*—Patrice Winder
(74) *Attorney, Agent, or Firm*—Schwegman, Lundberg & Woessner, P.A.

(57) ABSTRACT

A message database server receives a message request from an application program and returns a confirmation or error status to the application program after attempting to store the message information contained in the request to a data store. The data store may be maintained by the message database server or by a queuing system. A message server obtains the message information from the data store for transmission through either a pull or push methodology. In one aspect the message data store contains a set of personalization tags and an identifier for a message template that contains the text of the message to be sent. The message server creates the message by retrieving the message template specified by the identifier and filling in variables in the text in the template with the appropriate personalization tags.

30 Claims, 7 Drawing Sheets

DELIVERING MESSAGES TO MESSAGE SERVERS

FIELD OF THE INVENTION

This invention relates generally to electronic message services, and more particularly to delivering messages to message servers for transmission.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999-2002, eBay Inc., All Rights Reserved.

BACKGROUND OF THE INVENTION

Figures 1, 2:
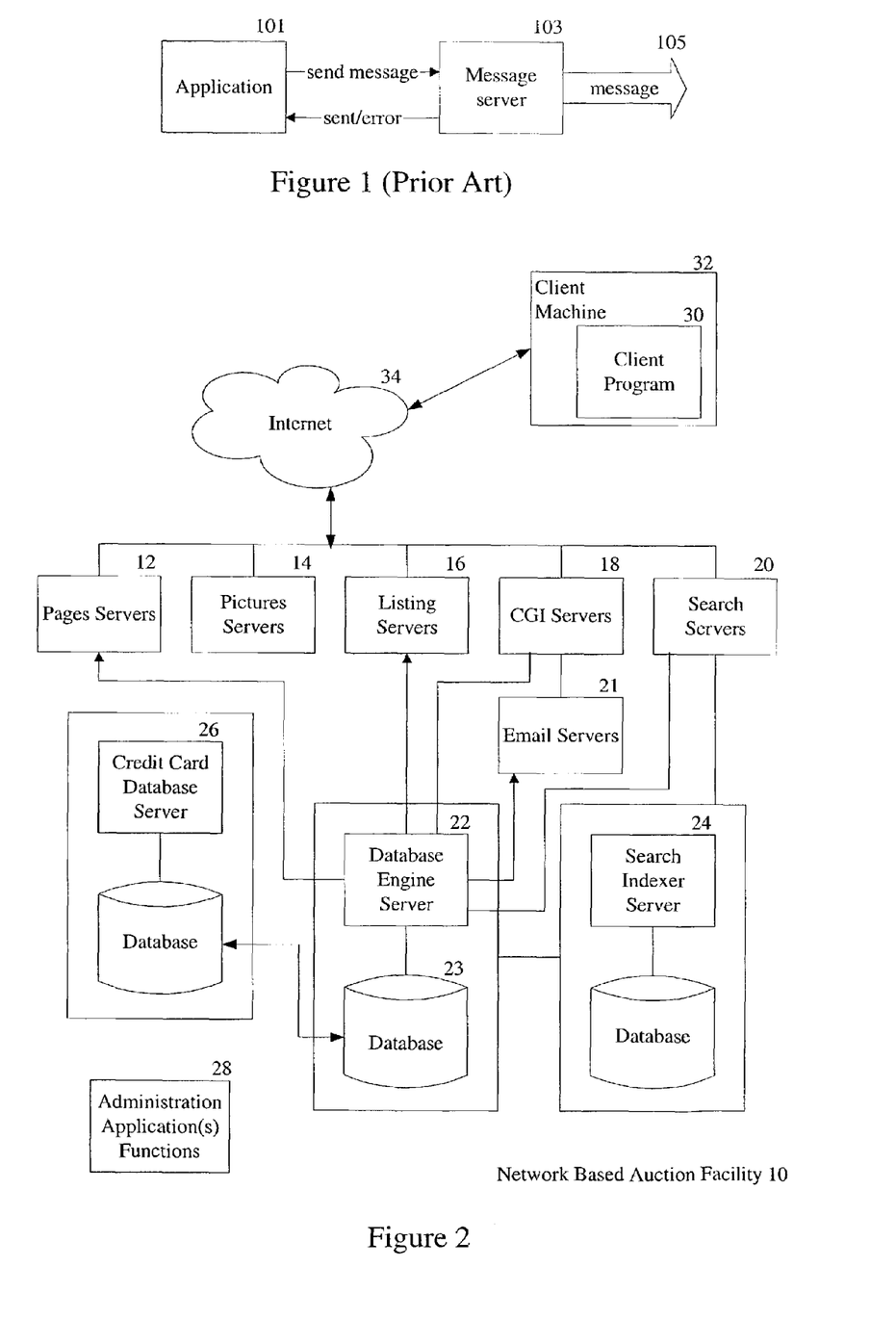
FIG. 1 is a diagram of a prior art message system.
FIG. 2 is a diagram of one embodiment of a transaction facility suitable for practicing the present invention.

In a typical prior art electronic messaging system, such as an email system, as shown in FIG. 1, an application program 101 sends a message request to a message server 103 and then waits until it receives a confirmation from the message server 103 that the message has been sent or it receives an error message that the message server 103 cannot transmit the message. Depending on its workload, the message server 103 may not respond quickly and therefore the application program 101 may wait for a long period of time for a response. One solution to the problem of slow turnaround times is to have the application program 101 queue the messages it wants to send and then send multiple requests to the message server 103 at one time. Queuing the messages allows the application program 101 to continue to do other things until it accumulates an appropriate number of messages, but the application program 101 must still wait for the message server 103 to respond once the queued message requests have been sent to the server 103.

However, when the message server 103 is non-operational, the application program 101 will wait indefinitely for a response whether it is sending single or queued message requests. To prevent such a scenario, the application program 101 commonly waits for a predetermined amount of time and then resubmits the message request(s) under the assumption that the message server 103 has failed. However, if the message server 103 is merely overloaded, the original message will still be in an outgoing queue on the message server 103 and therefore each re-submitted message will be sent twice, or possibly several times.

Thus, traditional prior art message systems are inefficient because of the delay imposed on the application programs by the message server and common approaches to reduce the delay introduce different inefficiencies into the message systems.

SUMMARY OF THE INVENTION

A message database server receives a message request from an application program and returns a confirmation or error status to the application program after attempting to store the message information contained in the request to a data store. The data store may be maintained by the message database server or by a queuing system. A message server obtains the message information from the data store for transmission through either a pull or push methodology. In one aspect the message data store contains a set of personalization tags and an identifier for a message template that contains the text of the message to be sent. The message server creates the message by retrieving the message template specified by the identifier and filling in variables in the text in the template with the appropriate personalization tags.

Since the time required to store a message into the message data store can be significantly shorter than the time necessary to transmit a message by the prior art system of FIG. 1, the amount of time the application must wait for a response to the message request is greatly reduced by the present invention. Additionally, when message templates are used, a message can be easily changed by editing the text in the corresponding template in the message template database without having to make extensive modifications to each application program that uses that particular message.

The present invention describes systems, clients, servers, methods, and computer-readable media of varying scope. In addition to the aspects of the present invention described in this summary, further aspects will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The following description of FIG. 2 is intended to provide an overview of a network-based transaction facility (e.g., business-to-business, business-to-consumer and consumer-to-consumer Internet marketplaces and retailers) but is not intended to limit the applicable computer environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. For the purposes of the present specification, the term "transaction" shall be taken to include any communications between two or more entities and shall be construed to include, but not be limited to, commercial transactions including sale and purchase transactions, auctions and the like. While exemplary embodiments of the present invention is described within the context of an Internet auction facility 10 as shown in FIG. 2, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. Email servers 21 provide automated email communications to users of the facility 10 and other services as known in the art. The back-end servers include a database engine server 22, a search index server 24 and a credit card DB server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

An exemplary embodiment of the client and server machines are described in conjunction with FIG. 7 below.

Figure 3A:
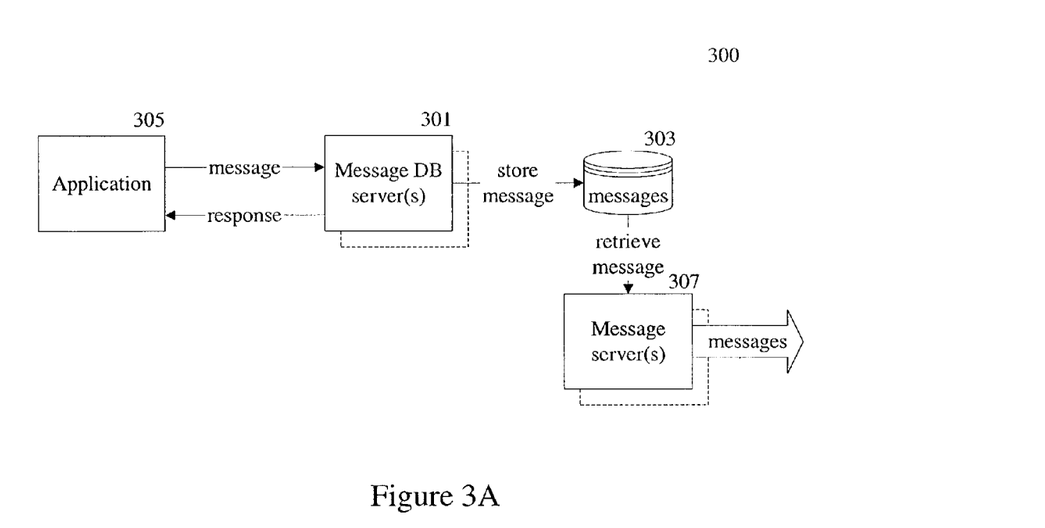
FIGS. 3A-C are diagrams illustrating a system-level overview of embodiments of the invention.

A system level overview of the operation of embodiments of the invention is now described with reference to FIGS. 3A-C. FIG. 3A illustrates a message system 300 containing multiple message database (DB) servers 301 and a message data store 303. An application program 305 sends a message request to one of the message database servers 301, which attempts to store the message specified in the request into the message data store 303. The message database server returns a status to the application program 305 that confirms the message is successfully stored or specifying an error if the message cannot be stored.

In one embodiment, no changes are necessary to the application program 305 to use the message database servers 301 because the message requests and status are identical to those in a prior art message system. It will be appreciated that the requests and status may be particular to the message system 300 if the application program is modified accordingly. When the application program invokes the prior art message system using a system call, the program is modified to issue the appropriate new system call and further modifications are unnecessary, even if special requests and status are used.

The message system 300 also includes multiple message servers 307, such the email servers 21 in FIG. 2, that transmit the messages through the appropriate communication network or forwards them to external message servers for transmission. The message servers 307 periodically retrieve undelivered (pending) messages from the message data store 303.

To avoid having the same message record retrieved by more than one message server, the message servers 307 may mark a message record as transmitted but not acknowledged. When the message is acknowledged, the appropriate message server may delete the message record from the message data store 303. In an alternate embodiment, the message servers 307 use conventional record locking techniques when they retrieve a message record. Thus, another message server in the distributed message system will not be able to access the record.

Because the message system 300 contains multiple message database servers and message servers, different servers can service different message formats, countries and languages, address domains, priorities or categories of messages. In one embodiment, the application programs direct the messages to the appropriate message database server and identifying information in the message records is used by the message servers to determine which records to retrieve. It will also be appreciated that the servers may be configured differently depending on the messages they handle. Thus, for example, if one message server services high priority messages, it may have a higher speed CPU to process the messages in a more rapid fashion than a message server that services lower priority messages.

In yet another embodiment, multiple servers can also be used to balance the message processing load by distributing the messages among the servers, or can provide failover capacity from one server to another.

Figure 3B:
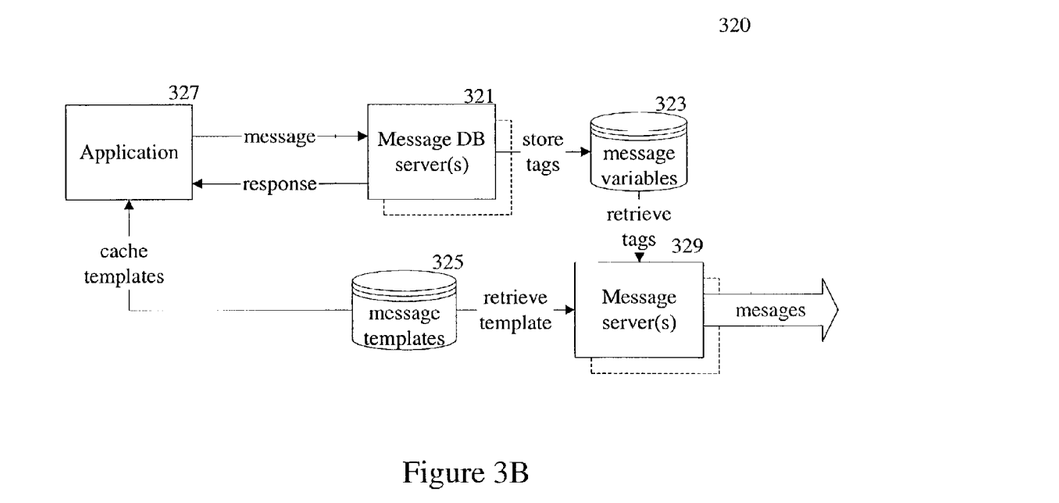

A further embodiment of the present invention is illustrated in FIG. 3B. In this embodiment, a message system 320 consists of message database servers 321, a message variable database 323, and a message template database 325. The message template database 325 holds templates that contain text for a standardized set of messages. The text contains slots for variables that will personalize the message for a particular addressee. The full text of a message is not stored in the database, but only the personalized values ("tags") for the variables for each undelivered message and an identifier for the associated template is also stored. Thus, the message variable database 323 is significantly smaller than the message data store 303 shown in FIG. 3A.

A message server 329 retrieves a record from the message variable database 323 containing the tags and template identifier for an undelivered message, identifies the template and retrieves the corresponding text from the message template database 325. The message server 329 formats the messages for transmission by inserting the tags for the addressee in the appropriate slots in the text contained in the message template. In this embodiment, the application program 327 is responsible for determining which of the message templates is to be used for a message and sends the appropriate tags and the identifier for the associated template in the message request to the message database servers 321. Alternatively, the application program 327 may issue a call containing the tags and identifier to invoke a subprogram that sends the information to the message database servers 321.

Because the text of the messages is not hard-coded into the application program 327, the message can be easily changed by editing the text in the corresponding template in the database 325 without having to make extensive modifications to each application program that uses a particular message. If the application program 327 caches those message templates it uses, as shown in FIG. 3B, a command can be issued when a template is changed to cause the program to flush the cache and reload the templates. While not shown in FIG. 3B, it will be appreciated that the message servers 329 could also cache the templates and would retrieve the appropriate template from their caches rather than from the message template database 325.

In an alternate embodiment, the template identifier consists of multiple fields, such as one that identifies a particular locale so that the application program 327 can send the same message in multiple languages merely by changing the value of the locale field in the template identifier. Furthermore, a field within a multi-field template identifier can be used to identify a logical division of an organization, which might also determine which of the multiple message servers would handle the message.

In a further alternate embodiment, a template is divided into sub-templates and contains parameter-driven commands that cause the message servers 329 to include or exclude certain sub-templates. The appropriate values for the parameters are set by the application program when the message request is sent to the message database servers 321.

Although the message data store and the template database have been illustrated and described as separate, one of skill in the art will readily understand that they may be combined into a single database.

Figure 3C:
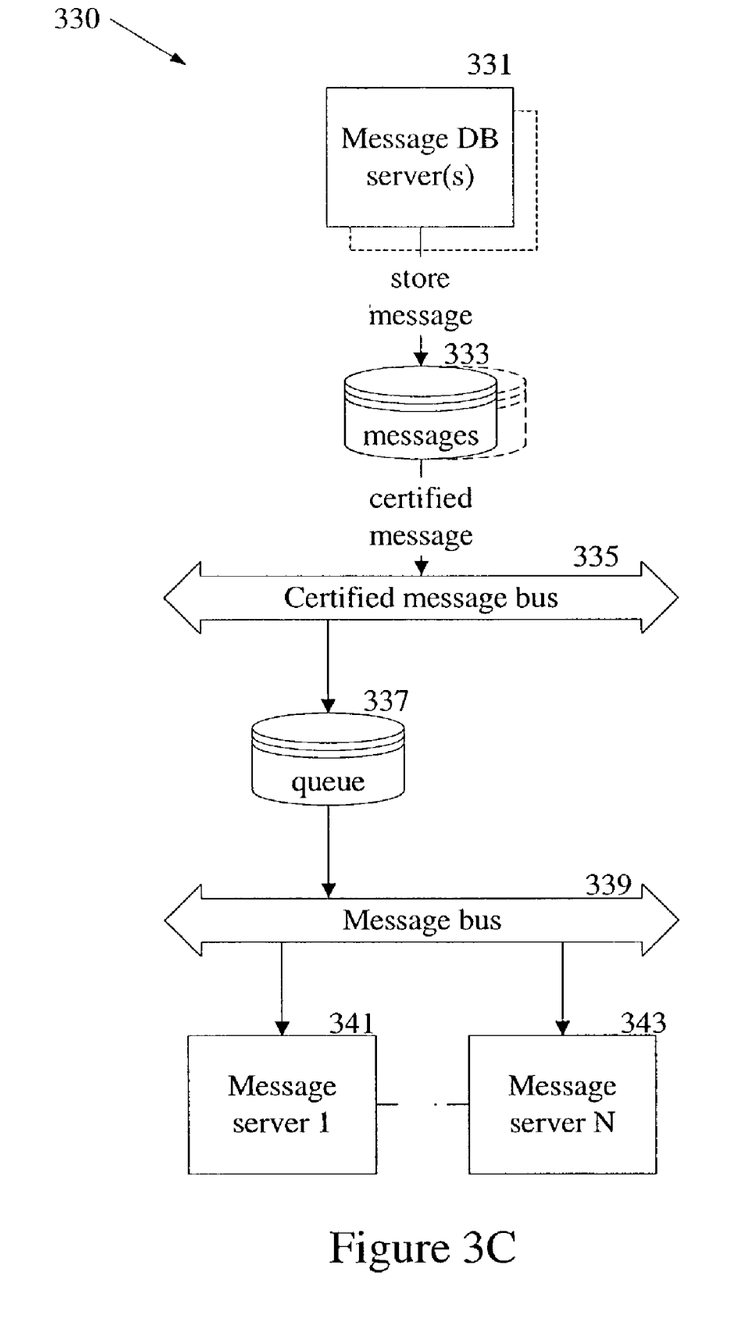

FIG. 3C illustrates a particular arrangement of communication buses used by a message system 330 according to one embodiment of the invention. When a message database server 331 stores a message into a message data store 333, the server 331 also transmits the message information as a certified message on a certified message bus 335 addressed to a queuing system (illustrated as queue 337). The certified message bus 335 will attempt to deliver the message to the queuing system until a time limit associated with the message expires, at which point the server 331 is notified that the delivery was unsuccessful. When a certified message is successfully delivered to the queuing system, the message information is stored in queue 337. The message database server 331 may delete the message information from the message data store 333 if it does not receive a non-delivery status within the time limit. In an alternate embodiment, the message database server 331 does not store a copy of the message into the message data store 333.

One of skill in the art will readily understand that the message information sent to the queuing system may be templated message information as described above in conjunction with FIG. 3B.

In one embodiment, the message servers 341, 343 periodically poll the queuing system through message bus 339 and retrieve ("pull") any appropriate pending messages from the queue 337. When a message is retrieved, the message server may send a confirmation to the queuing system to notify the queuing system that it can delete the message from the queue 337.

In an alternate embodiment, the queuing system acts as a publish-subscribe message broker that "pushes" messages from the message database servers 331 to the message servers 341, 343. The messages are categorized according to message characteristics, such as priority, message type, address domain, etc. One or more message database servers 331 are dedicated to each message category. The queuing system establishes a virtual connection ("topic") to deliver a particular category of messages and the message servers 341, 343 subscribe to the topics corresponding to the categories of messages they handle. A message database server publishes its messages to the appropriate topic by sending the certified message on the certified message bus 335. The message servers 341, 343 receive the published messages through the message bus 339. The queue 337 serves as a persistent store for published messages. The queue 337 may be aged so that messages are deleted after a certain period of time. The messages may also be deleted if all subscribing message servers indicate they have received the message.

In yet another embodiment, the published messages are not persistently stored in the queue 337.

The system level overview of the operation of an embodiment of the invention has been described in this section of the detailed description. While the invention is not limited to any particular configuration of computers, a message server system containing multiple message database server computers and multiple message server computers has been described. It will be appreciated that a message database server computer might also function as a message server computer without exceeding the scope of the invention. Furthermore, a messaging system according to the present invention may have only a single message database server and/or a single message server.

The particular methods of the invention are next described in terms of computer software with reference to a series of flowcharts illustrated in FIGS. 4A-C, 5 and 6A-B. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media) acting as clients or servers in accordance with the invention. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

Figure 4A:
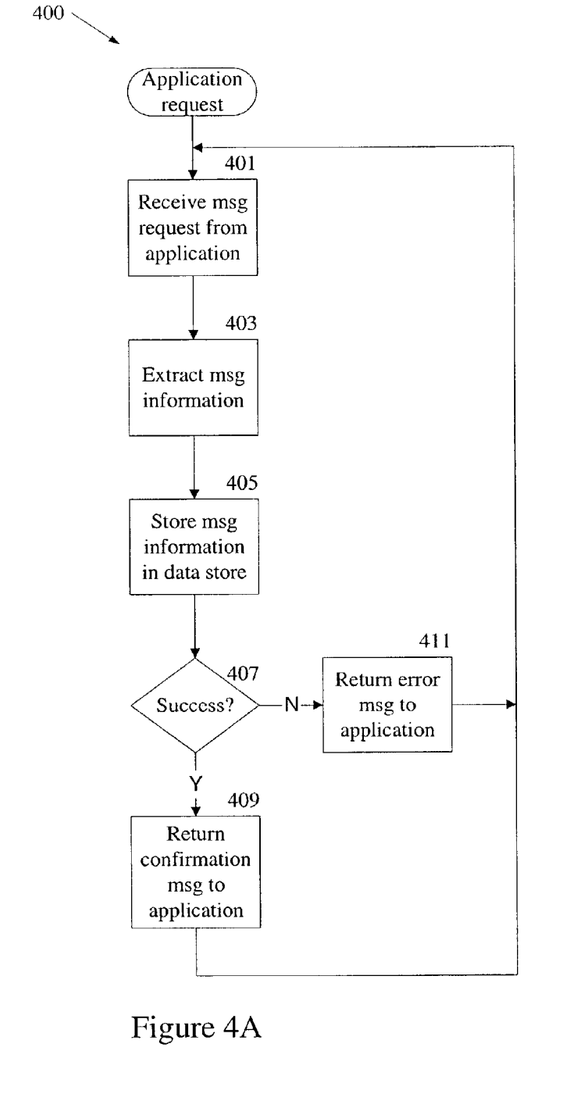
FIGS. 4A-B are flowcharts of methods to be performed by a message database server computer according to the embodiments illustrated in FIGS. 3A-C.
Figure 4B:
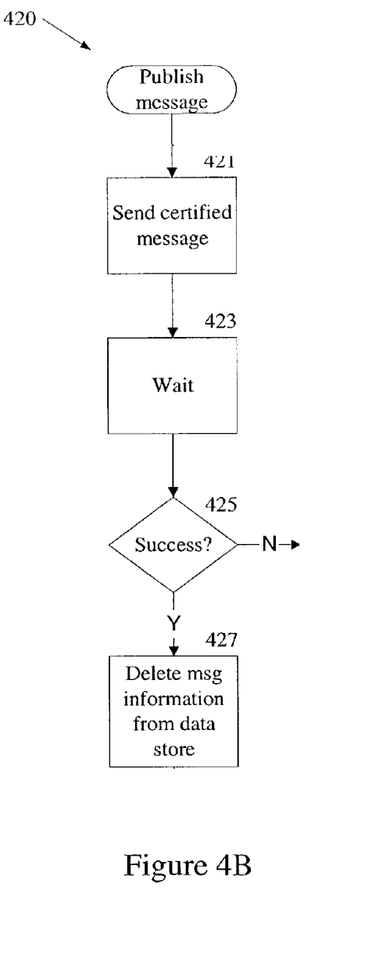
Figure 5:
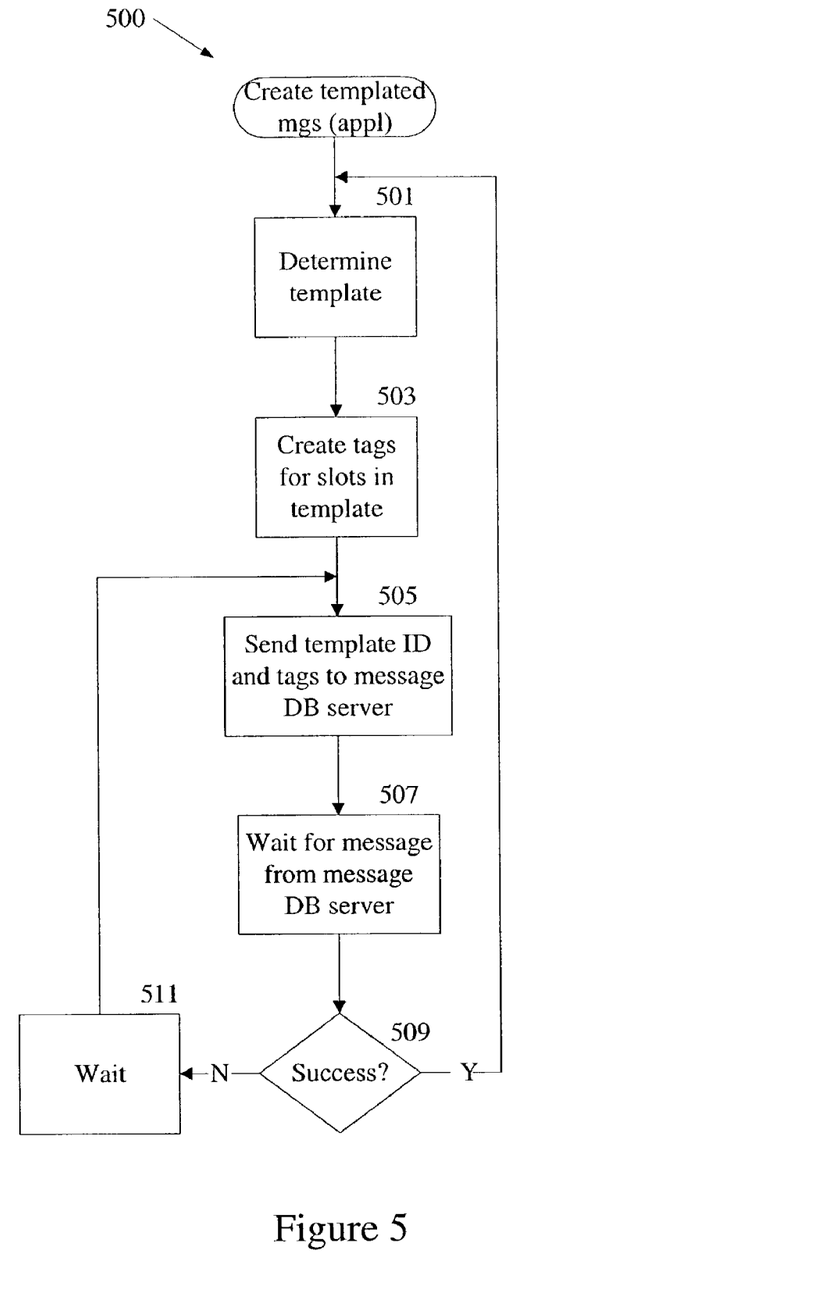
FIG. 5 is a flowchart of a method to be performed by a client computer according to the embodiment illustrated in FIG. 3B.
Figure 6A:
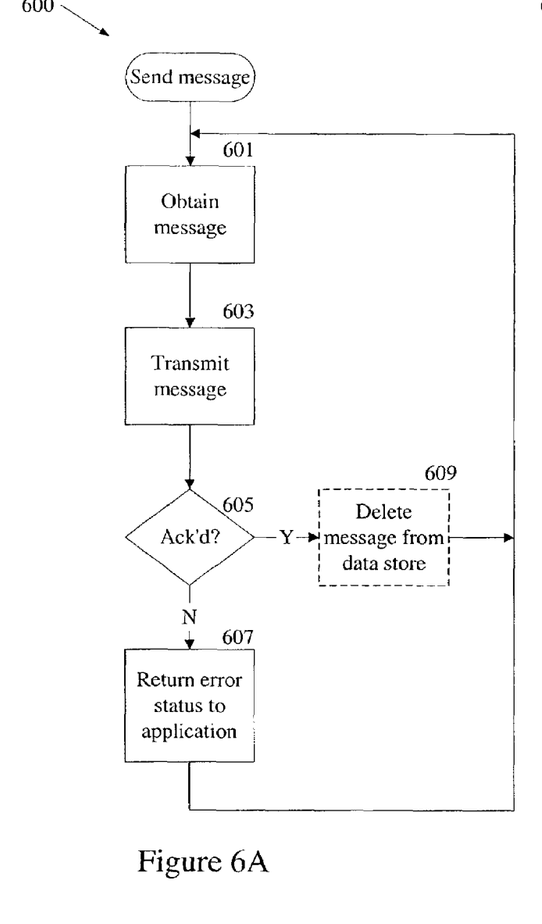
FIGS. 6A-B are flowchart of methods to be performed by a message server computer according to to the embodiments illustrated in FIGS. 3A-C.
Figure 6B:
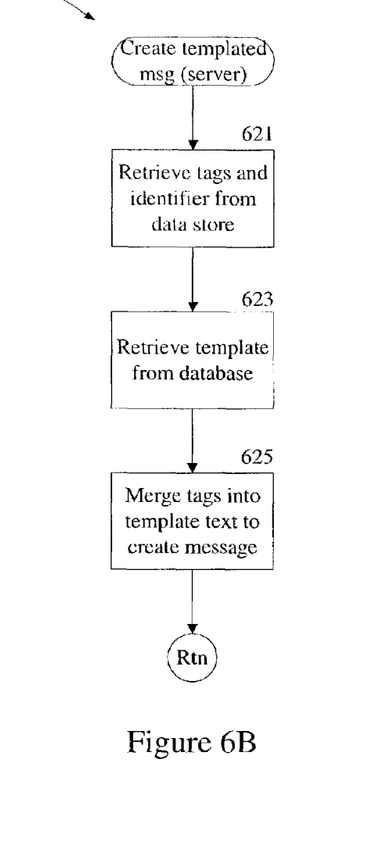

FIGS. 4A-B are flowcharts illustrating embodiments of methods to be executed by a message database server, such as servers 301, 321, 331. FIG. 5 is a flowchart illustrating one embodiment of a method to be executed by a client computer to support an application in creating templated message as described in conjunction with FIG. 3B. FIG. 6A is a flowchart illustrating one embodiment of a method to be executed by a message server, such as servers 307, 329, 331, when sending messages. FIG. 6B is a flowchart illustrating one embodiment of a supporting method when a message server processes templated messages as described in the embodiment shown in FIG. 3B.

Beginning with FIG. 4A, the application request method 400 executing on the message database server receives a message request from an application (block 401) and extracts message information from the request (block 403). When the message request is a standard message request, the message information extracted at block 403 is the standard message address and text fields. When the message request is a templated message request, the message information extracted at block 403 is the template identifier and the tags to be placed in the slots in the template text. The application request method 400 attempts to store the message information in the message data store at block 405. If the message information was successfully stored (block 407), the method 400 returns a confirmation status to the application (block 409). The record in the data store created from the message information may be marked as "undelivered" as part of the processing represented by block 409. If the message information could not be stored, the method 400 returns an error status to the application at block 411.

In the publish-subscribe embodiment described above in conjunction with FIG. 3C, the message database server also executes a publish message method 420 as illustrated in FIG. 4B. The information for a pending message is sent as a certified message (block 421). The message database server waits at block 423. If a notification of non-delivery is received (block 425), the record remains marked as pending in the data store and the message database server may attempt to publish the message at a later time. Otherwise, if a message of non-delivery is not received before the time limit for the message expires, the message database server deletes the message information record from the data store at block 427.

As described previously in conjunction with FIG. 3B, one embodiment of the invention uses templated message in order to save space in the message data store. An embodiment of a create templated message method 500 for an application is shown in FIG. 5. One of skill in the art will readily appreciate that method 500 can be incorporated directly into an application program or can be implemented as a sub-program on the client computer executing the application program or another computer connected to the client computer in a networked system. The create templated message method 500 chooses the appropriate template to use for a particular message (block 501) and creates the tags for the slots in the chosen template (block 503). The template identifier and the tags are sent to the message database server at block 505 and the method 500 waits for a return message from the message database server (block 507). If the message information was successfully stored in the database by the message database server (block 509), the method 500 loops back to wait for the application program to generate another message. An unsuccessful store of the message information causes the method 500 to wait at block 511 for a predetermined period of time and then to attempt to send the information again for storage.

FIG. 6A illustrates a send message method 600 that is executed by a message server to process messages for transmission. A pending message is obtained at block 601 by retrieving the message information from a message data store maintained by a message database server or from a persistent data store maintained by a queuing system through either a pull or a push methodology as described above. The message is transmitted (block 603) and the method 600 waits to receive an acknowledgement from the receiving message server. If no acknowledgment is received within a pre-determined amount of time or an error message is received, an error status is returned to the application that originated the message (block 607). If an acknowledgment is received, the method 600 may optionally delete the message from the data store (shown in phantom at block 609) as described above in conjunction with FIG. 3A.

When the message is templated, a supporting create templated message method 620 is executed a part of the processing at block 601. The method 620 retrieves a message information record containing tags and a template identifier from the message data store (block 601). The identifier is used to retrieve the appropriate template from the template database or cache (block 623) and the tags are merged into the text in the template to create the message (block 625). The method 620 returns the resulting message to the method 600 at block 603.

The particular methods performed by clients and servers of embodiments of the invention have been described. The methods performed by a message database server computer has been shown by reference to flowcharts in FIGS. 4A and 4B including all the acts from 401 until 411 and from 421 until 427, respectively. The method performed by a client computer to support an application program that sends templated message has been shown by reference to a flowchart in FIG. 5 including all the acts from 501 until 511. The methods performed by a message server computer has been shown by reference to flowchart in FIGS. 6A-B including all the acts from 601 until 609 and from 621 until 625, respectively. It will be appreciated that more or fewer processes may be incorporated into the methods illustrated in FIGS. 4A-B, 5 and 6A-B without departing from the scope of the invention and that no particular order is implied by the arrangement of blocks shown and described herein.

Figure 7:
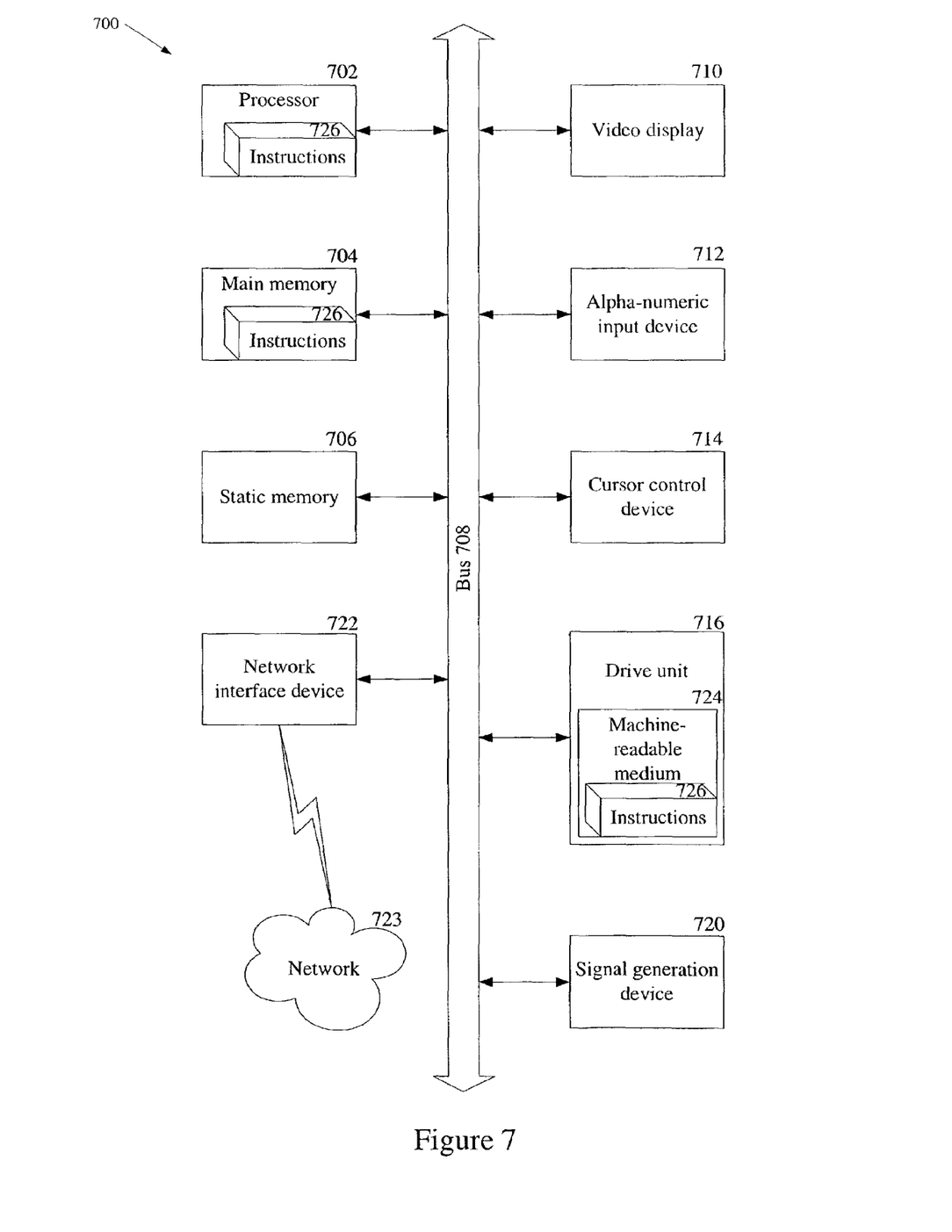
FIG. 7 is a diagram of one embodiment of an operating environment suitable for practicing the present invention.

The following description of FIG. 7 is intended to provide an overview of computer hardware and other operating components suitable for implementing the invention, but is not intended to limit the applicable environments. FIG. 7 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

FIG. 7 shows one example of a conventional computer system that can be used as client or server machines. The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g. a keyboard), a cursor control device 714 (e.g. a mouse), a drive unit 716, a signal generation device 720 (e.g. a speaker) and a network interface device 722

The disk drive unit 716 includes a machine-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722.

The computer system 700 interfaces to external systems through the modem or network interface 722. It will be appreciated that the modem or network interface 722 can be considered to be part of the computer system 700. This interface 722 can be an analog modem, ISDN modem, cable modem, token ring interface, satellite transmission interface (e.g. "Direct PC"), or other interfaces for coupling a computer system to other computer systems. The computer system 700 and the external systems can be connected in a local area network (LAN) configuration or in a wide-area network WAN configuration (generically represented as network 723). The LAN and WAN 723 can be either public or private networks. One of the most widely used public WANs is the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

The processor 702 can be a conventional microprocessor such as an Intel Pentium microprocessor or Motorola Power PC microprocessor. The main memory 704 can be dynamic random access memory (DRAM) and can also include static RAM (SRAM). The drive unit 715 is non-volatile storage, such as a magnetic hard disk, an optical disk, or another form of storage for large amounts of data. Some of this data is often written, by a direct memory access process, into memory 702 during execution of software in the computer system 701. One of skill in the art will immediately recognize that the terms "computer-readable medium" and "machine-readable medium" includes any type of storage device capable of storing or encoding a sequence of instructions for execution by the processor 702 that causes the machine to perform any one of the methodologies of the present invention. The terms shall accordingly be taken to include, but not be limited to, solid-state memories, optical and magnetic disks, and carrier wave signals that encode data signals.

It will be appreciated that the computer system 700 is one example of many possible computer systems which have different architectures. For example, personal computers based on an Intel microprocessor often have multiple buses, one of which can be considered to be a peripheral bus. Network computers are another type of computer system that can be used with the present invention. Network computers do not usually include a hard disk or other mass storage, and the executable programs are loaded from a network connection into the memory 704 for execution by the processor 702. A Web TV system, which is known in the art, is also considered to be a computer system according to the present invention, but it may lack some of the features shown in FIG. 7, such as certain input or output devices. A typical computer system will usually include at least a processor, memory, and a bus coupling the memory to the processor.

It will also be appreciated that the computer system 700 is controlled by operating system software which includes a file management system, such as a disk operating system, which is part of the operating system software. One example of an operating system software with its associated file management system software is the operating system known as Windows '95® from Microsoft Corporation of Redmond, Wash., and its associated file management system. The file management system is typically stored in the drive unit 715 and causes the processor 702 to execute the various acts required by the operating system to input and output data and to store data in memory, including storing files on the drive unit 716.

A message data store and message server system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, the term message database server is intended to cover any server computer that operates as described herein. Those of ordinary skill within the art will appreciate that the term data store as used herein covers all type of data storage structures, including indexed flat files, tree structures, and relational database tables. Furthermore, those of ordinary skill within the art will appreciate when a relational database is used as the message data store, there may be multiple tables holding the message information and that the information may be divided among like tables based on particular characteristics of the information.

The terminology used in this application with respect to message and database systems is meant to include all such environments. Therefore, it is manifestly intended that this invention be limited only by the following claims and equivalents thereof.

What is claimed is:

1. A computerized method comprising:
   receiving message information in a templated message request from an application, the message information including an identifier for a message template in a message template database, the message template including a plurality of variables, and a value for at least one of the plurality of variables;
   sending the message information in a certified message to a queuing system for storage in a data store managed by the queuing system and accessible by a message server;
   returning a status to the application; and
   deleting the message information from the data store after a pre-defined period of time.

2. The computerized method of claim 1 further comprising:
   publishing the message information by category for access by a message server subscribing to the category.

3. The computerized method of claim 1, wherein the status comprises:
   confirmation that the message information has been stored.

4. The computerized method of claim 1, wherein the identifier comprises multiple fields.

5. The computerized method of claim 1, wherein the message template further comprises:
   a plurality of sub-templates; and
   a command to select one of the plurality of sub-templates based on parameters included in the templated message request by the application.

6. A computer-readable medium having executable instructions to cause a computer to perform a method comprising:
   receiving message information in a templated message request from an application, the message information including an identifier for a message template in a message template database, the message template including a plurality of variables, and a value for at least one of the plurality of variables;
   sending the message information to a queuing system for storage in a data store managed by the queuing system and accessible by a message server; and
   returning a status to the application, wherein the status includes a storage confirmation status when the message information is stored in the data store, and wherein the status includes an error status when the message information is not stored in the data store.

7. The computer-readable medium of claim 6, wherein the method further comprises:
   deleting the message information from the data store after a pre-defined period of time.

8. The computer-readable medium of claim 6, wherein the method further comprises:
deleting the message information from the data store upon successful transmission by the message server.

9. The computer-readable medium of claim 6, wherein the method further comprises:
storing the message information in a secondary data store; and
deleting the message information from the secondary data store when the message information is successfully delivered to the queuing system.

10. The computer-readable medium of claim 6, wherein the method further comprises:
publishing the message information by category for access by a message server subscribing to the category.

11. The computer-readable medium of claim 6, wherein the identifier comprises multiple fields.

12. The computer-readable medium of claim 6, wherein the message template further comprises:
a plurality of sub-templates; and
a command to select one of the plurality of sub-templates based on parameters included in the templated message request by the application.

13. A system comprising:
a processor coupled to a memory through a bus;
a network interface coupled to the processor through the bus, the network interface to couple to a queuing system that manages a data store accessible by a message server;
a message process executed by the processor from the memory to cause the processor to receive message information in a templated message request from an application, the message information including an identifier for a message template in a message template database, the message template including a plurality of variables, and a value for at least one of the plurality of variables, send the message information in a certified message to the queuing system to store the message information in the data store, and return a status to the application; and
a secondary data store coupled to the processor through the bus, and wherein the message process further causes the processor to store the message information in the secondary data store, and delete the message information from the secondary data store when the message information is successfully delivered to the queuing system.

14. The system of claim 13, wherein the message process further causes the processor to categorize the message information for publication by the queuing system.

15. The system of claim 13, wherein the identifier comprises multiple fields.

16. The system of claim 13, wherein the message template further comprises:
a plurality of sub-templates; and
a command to select one of the plurality of sub-templates based on parameters included in the templated message request by the application.

17. A messaging system comprising:
a message database server coupled to a queuing system through a certified message bus, wherein the message database server sends message information received in a templated message request from an application to the queuing system in a certified message, the message information including an identifier for a message template in a message template database coupled to the message database server, the message template including a plurality of variables, and a value for at least one of the plurality of variables, and the queuing system stores the message information in the certified message in a data store, wherein the certified message bus attempts to deliver the certified message to the queuing system until a time limit associated with the certified message expires; and
a message server coupled to the queuing system through a message bus to access the message information in the data store for transmission.

18. The system of claim 17, wherein the queuing system publishes the message information in a category and the message server accesses the message information by subscribing to the category.

19. The system of claim 18, wherein the message database server further stores the message information in a secondary data store coupled to the message database server and deletes the message information from the secondary data store when the certified message is successfully delivered to the queuing system.

20. The system of claim 17, wherein the queuing system deletes the message information from the data store after a pre-defined period of time.

21. The system of claim 17, wherein the queuing system deletes the message information from the data store upon successful transmission by the message server.

22. The system of claim 17, wherein the message data base server returns a status to the application.

23. The system of claim 22, wherein the status comprises:
confirmation that the message information has been stored.

24. The system of claim 17, wherein the identifier comprises multiple fields.

25. The system of claim 17, wherein the message template further comprises:
a plurality of sub-templates; and
a command to select one of the plurality of sub-templates based on parameters included in the templated message request by the application.

26. A computerized method comprising:
receiving message information in a templated message request from an application, the message information including an identifier for a message template in a message template database, the message template including a plurality of variables, and a value for at least one of the plurality of variables;
sending the message information to a queuing system for storage in a data store managed by the queuing system and accessible by a message server; and
returning a status to the application.

27. The computerized method of claim 26 further comprising:
publishing the message information by category for access by a message server subscribing to the category.

28. The computerized method of claim 26, wherein the status comprises:
confirmation that the message information has been stored.

29. The computerized method of claim 26, wherein the identifier comprises multiple fields.

30. The computerized method of claim 26, wherein the message template further comprises:
a plurality of sub-templates; and
a command to select one of the plurality of sub-templates based on parameters included in the templated message request by the application.

* * * * *